United States Patent [19]
Davis

[11] Patent Number: 5,638,628
[45] Date of Patent: Jun. 17, 1997

[54] APPARATUS FOR JIGGING FISHING TACKLE AND METHOD OF FISHING THEREWITH

[76] Inventor: Scott F. Davis, 401 E. Wilson Ave., Appleton, Wis. 54915

[21] Appl. No.: 497,646

[22] Filed: Jun. 30, 1995

[51] Int. Cl.[6] .................................................. A01K 97/10
[52] U.S. Cl. .................................................. 43/4.5; 43/19.2
[58] Field of Search .................................. 43/4, 4.5, 19.2, 43/26

[56] References Cited

U.S. PATENT DOCUMENTS

| | | | |
|---|---|---|---|
| 3,126,180 | 3/1964 | Mandolare | 43/21.2 X |
| 3,422,561 | 1/1969 | McLean | 43/19.2 |
| 3,623,259 | 11/1971 | Rode | 43/19.2 |
| 5,119,580 | 6/1992 | Schulte et al. | 43/19.2 |
| 5,535,538 | 7/1996 | Heuke | 43/19.2 |

*Primary Examiner*—Joseph J. Hail, III
*Assistant Examiner*—Jay A. Stelacone
*Attorney, Agent, or Firm*—Nilles & Nilles, S.C.

[57] ABSTRACT

A fixture for imparting to a fishing rod a jigging motion including: I) a structure for mounting the fixture on a surface; II) a structure for receiving the fishing rod, the structure for receiving the fishing rod A) being pivotally carried by the structure for mounting the fixture on a surface and B) including a structure for following; III) a structure for providing a displacement surface, the displacement surface A) being in operable connection with the structure for following and B) including: 1) a rise section which causes the displacement surface to engage the structure for following; and 2) a return section which causes the displacement surface to disengage the structure for following; IV) a structure for biasing the structure for receiving the fishing rod, the structure for biasing A) being connected to both the structure for receiving and the structure for mounting, B) reducing stress on both the structure for providing a displacement surface and the structure for following during engagement of the structure for providing a displacement surface with the structure for following and C) decelerating the structure for receiving during disengagement of the structure for providing a displacement surface with the structure for pivoting; and V) a structure for receiving and modifying energy from a natural source into mechanical movement of the structure for providing a displacement surface so as to impart to the fishing rod the jigging motion.

20 Claims, 3 Drawing Sheets

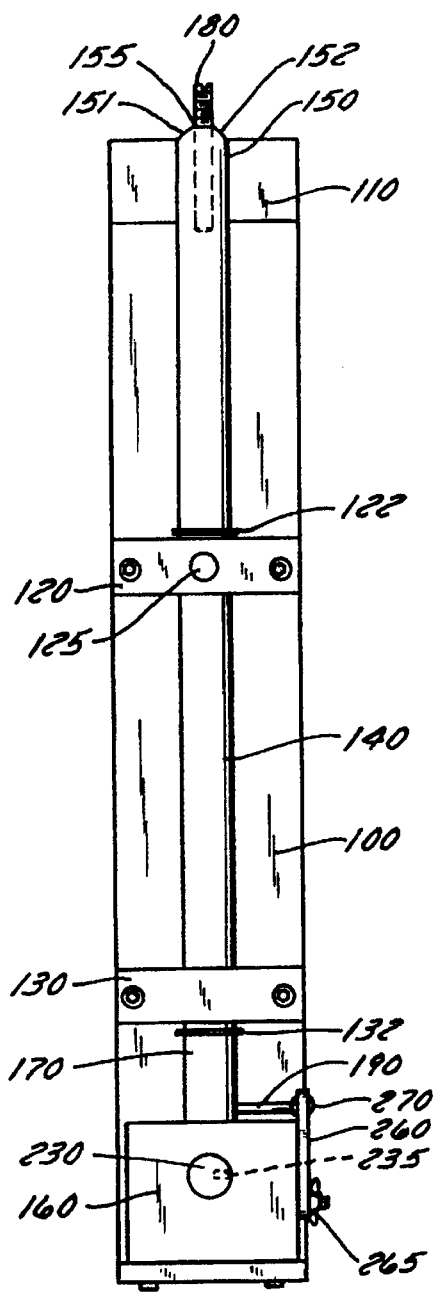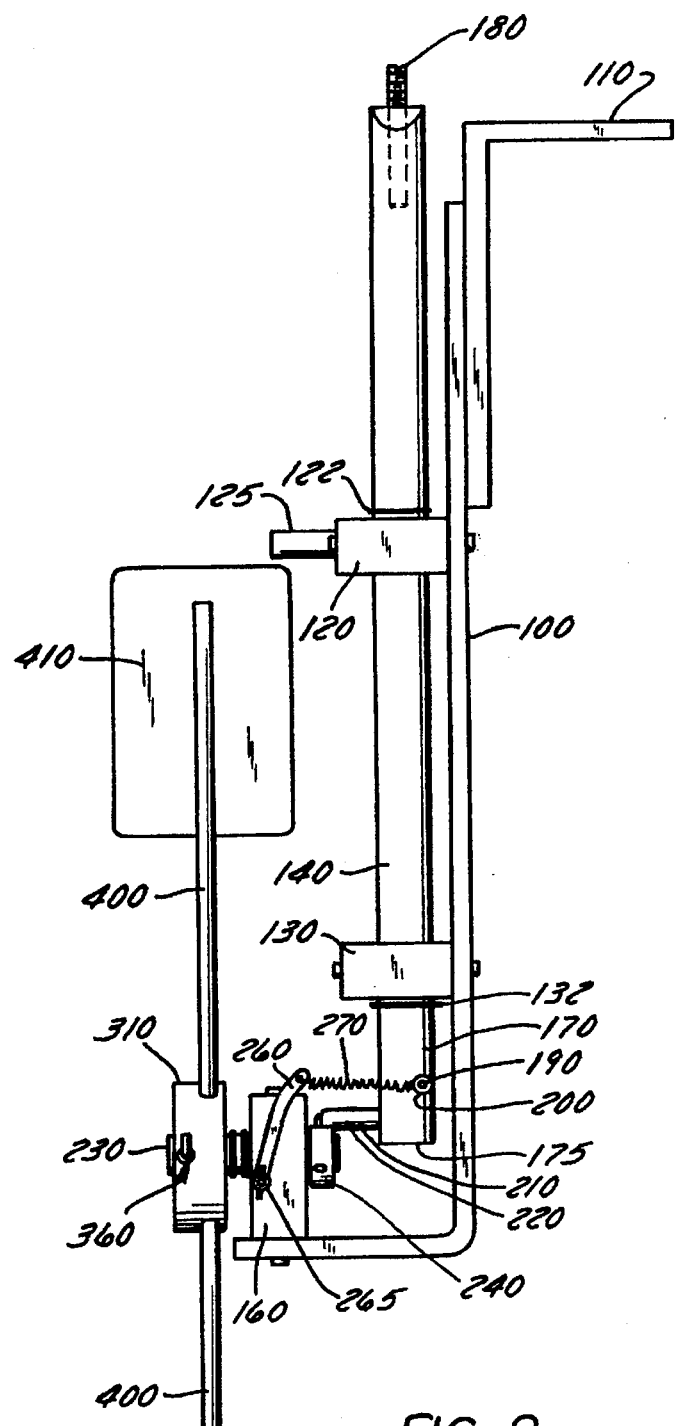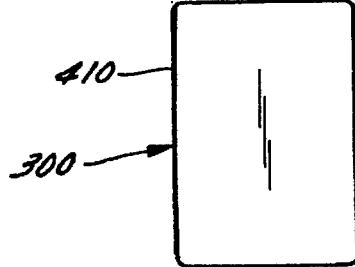
FIG. 1
FIG. 2

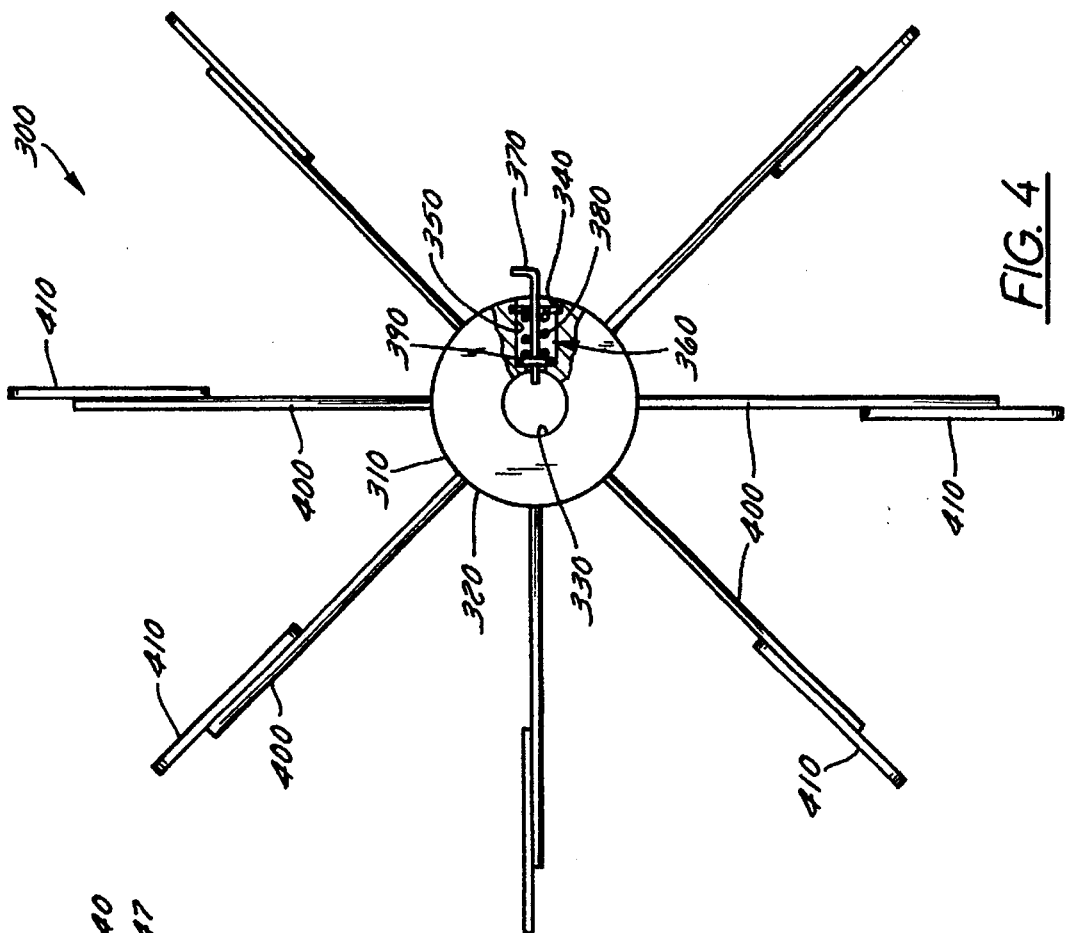
FIG. 4
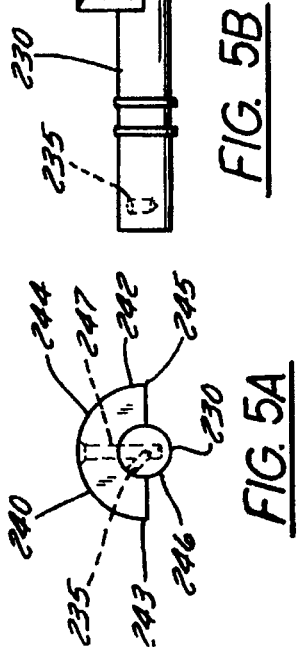
FIG. 5B
FIG. 5A
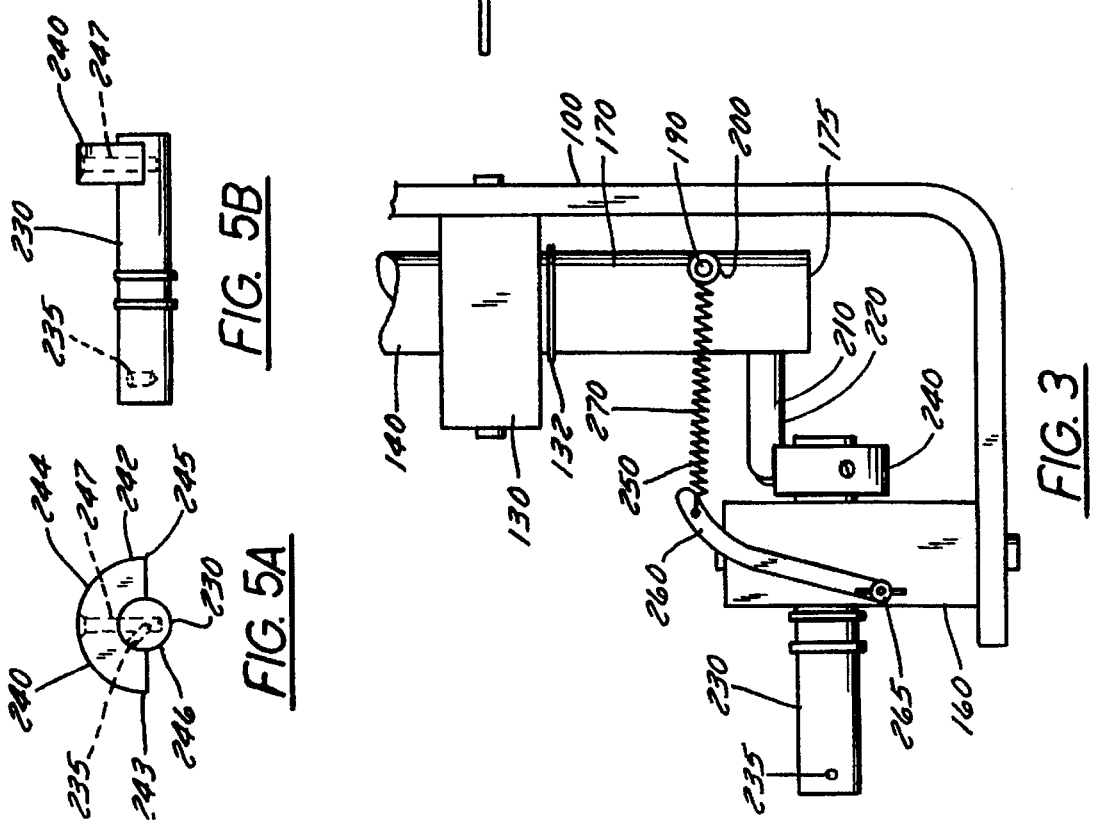
FIG. 3

APPARATUS FOR JIGGING FISHING TACKLE AND METHOD OF FISHING THEREWITH

BACKGROUND OF THE INVENTION

1. Field of the Invention

The present invention relates generally to the field of fishing. More particularly, the present invention concerns apparatus for agitating fishing tackle. Specifically, a preferred embodiment of the present invention is directed to apparatus having a water powered paddle wheel that imparts a jigging motion to fishing tackle. The present invention thus relates to apparatus of the type that can be termed a jig wheel.

2. Discussion of the Related Art

Heretofore, it was known in the prior art to agitate fishing tackle so as to encourage fish to strike. A conventional fishing rod is typically agitated in an oscillatory manner. For example, the tip of a fishing rod can be repeatedly raised and lowered by hand.

A previously recognized problem has been that manual jigging is tiring. One who is fishing may fail to be jigging when a fish is within striking range. What is needed therefore is a mechanical apparatus for jigging. Heretofore this requirement has not been fully met without incurring various disadvantages.

One unsatisfactory previously recognized solution to the problem of providing jigging apparatus was to place a fishing rod in a mechanically actuated rod holder. A disadvantage of this previously recognized solution is that sufficient power must be available to overcome the inertia of the rod and the resistance of the bait in the water. Further, this previously recognized solution also has the disadvantage of imparting a return motion on the bait that is entirely a function of the mechanical design.

The below-referenced U.S. patents disclose embodiments that were at least in-part satisfactory for the purposes for which they were intended. The disclosures of all the below-referenced prior United States patents and applications in their entireties are hereby expressly incorporated by reference into the present application for purposes including, but not limited to, indicating the background of the present invention and illustrating the state of the art. U.S. Pat. No. 3,126,180 discloses a fish rod holder and foot trip. U.S. Pat. No. 3,422,561 discloses a trolling device for fishing. U.S. Pat. No. 3,623,259 discloses a fishing rod agitator.

SUMMARY OF THE INVENTION

By way of summary, the present invention jigs fishing tackle with a motion that includes a component vector that is parallel to the surface of a body of water by using a water powered paddle wheel which turns a cam that drives a follower which oscillates a shaft. The present invention includes a dampener that is connected to the shaft. The dampener reduces stress on the cam and follower during the rise of the follower and decelerates the motion of the oscillatory shaft during the return of the follower. Therefore, the force exerted by the dampener is adjustable. An effect of the present invention is that the fishing tackle moves in a fashion that is at least in-part dependent of the relative movement of the water during the return of the follower.

It is therefore an object of the invention is to provide an apparatus which includes a dampener that can be adjusted. Another object of the invention is to provide an apparatus that is ruggedized and reliable, thereby decreasing down time and operating costs. Another object of the invention is to provide an apparatus that has one or more of the characteristics discussed above but which is relatively simple to manufacture and assemble using a minimum of equipment.

In accordance with a first aspect of the invention, these objects are achieved by providing a fishing pole agitator comprising: A) a frame; B) a clamp bracket removably attached to said frame; C) an upper oscillating shaft support attached to said frame, said upper oscillating shaft including an upper oscillating shaft support hole; D) a lower oscillating shaft support attached to said frame, said lower oscillating shaft including a lower oscillating shaft support hole; E) an oscillating shaft that passes through, and is freely rotatable within, both said upper oscillating shaft support hole and said lower oscillating shaft support hole, said oscillating shaft defining an oscillating shaft axis and including: 1) a first oscillating shaft tip having a first bevel, a second bevel and a first end face; 2) a second oscillating shaft tip having a second end face; 3) a mounting bolt protruding from said first end face of said first oscillating shaft tip, said mounting bolt defining a mounting bolt axis that is approximately coaxial with said oscillating shaft axis; and 4) a spring arm attached to said second oscillating shaft tip, said spring arm i) including a sleeve bumper, ii) protruding tangentially away from said second oscillating shaft end and iii) defining a spring arm axis that is approximately perpendicular to said oscillating shaft axis; 5) a pivot arm attached to said second oscillating shaft tip between said mounting bolt and said second end face, said pivot arm i) including an oscillating follower, ii) protruding radially away from said second oscillating shaft end and iii) defining a pivot arm axis that is approximately perpendicular to said oscillating shaft axis; F) a rotating shaft support connected to said frame, said rotating shaft support having a rotating shaft hole defining a rotating shaft hole diameter; G) a rotating shaft that passes through, and is freely rotatable within, said rotating shaft hole, said rotating shaft defining i) a rotating shaft axis that is approximately perpendicular to said oscillating shaft axis and ii) a rotating shaft diameter that is smaller than said rotating shaft hole diameter; H) a barrel cam attached to said rotating shaft, said barrel cam defining a cam center that is approximately coaxial with said rotating shaft axis and having a cam profile that includes: 1) a rise section; 2) an in-contact dwell section; 3) a return section; and 4) an out-of-contact dwell section; I) a dampener connected to said rotating shaft support, said dampener including: 1) a spring bracket removably adjustably connected to said rotating shaft support, said spring bracket including a first spring bracket end connected to said rotating shaft support and a second spring bracket end; and 2) an extension spring having a first extension spring end attached to said spring arm and a second extension spring end attached to said second spring bracket end, said extension spring exerting a restorative force upon said spring arm so as to turn said oscillating shaft around said oscillating shaft axis in a first direction and urge said oscillating follower away from said barrel cam; J) a detachable driving rotor removably attached to said rotating shaft, said detachable driving rotor including: 1) a hub defining a hub axis and having: a) an outer rim that is coaxial with said hub axis; b) an inner rim that is coaxial with said hub axis; c) a hub rotating shaft hole that is coaxial with said hub axis, said hub rotating shaft hole defining a hub diameter that is larger than said rotating shaft diameter; d) a hub pin hole that passes through said outer rim; and e) a pin recess that passes through said inner rim and is contiguous with both said hub rotating shaft hole and said hub pin hole; 2) a quick release mechanism having: a) a pin which passes through said hub pin hole; b) a compression spring surrounding said pin and located in said pin recess; c) and a pin retainer attached to said pin, adjacent said compression spring and located in said pin recess; 3) a plurality of spokes radially connected to the outer rim of the hub; and 4) a plurality of paddles, each of said plurality of paddies i) defining a plane that is substantially parallel to said hub axis and ii) being connected to one of said plurality of spokes, wherein, upon application of an external force acting upon said mounting bolt so as to turn said oscillating shaft around said oscillating shaft axis in a second direction that is opposite to said first direction, the external force urges said oscillating follower toward said barrel cam so as to define i) an equilibrium angle with regard to said rotating shaft axis, when the restorative force equals the external force, so that said oscillating follower is not in contact with said barrel cam and ii) a contact angle with regard to said rotating shaft axis, when the restorative force is less than the external force, so that said oscillating follower is in contact with said barrel cam. In one embodiment, the oscillating follower is an oscillating roller follower.

Another object of the invention is to provide a method of jigging fishing tackle that can be adjusted to circumstances, such as, for example, current speed and bait size. Another object of the invention is to provide a method that is predictable and reproducible, thereby decreasing variance and operating costs. Another object of the invention is to provide a method that has one or more of the characteristics discussed above but which is which is relatively simple to setup and operate.

In accordance with another aspect of the invention, these objects are achieved by providing a method of fishing comprising: I) providing a fixture for imparting to a fishing rod a jigging motion including: A) a means for mounting the fixture on a surface; B) a means for receiving the fishing rod, said means for receiving the fishing rod 1) being pivotally carried by said means for mounting the fixture on a surface and 2) including a means for following; C) a means for providing a displacement surface, said displacement surface i) being in operable connection with said means for following and ii) including: 1) a rise section which causes said displacement surface to engage said means for following; 2) a dwell section which maintains said displacement surface in engagement with said means for following; 3) a return section which causes said displacement surface to disengage said means for following; and 4) a dwell section which maintains said displacement surface in disengagement with said means for following; D) a means for biasing said means for receiving the fishing rod, said means for biasing 1) being connected to both said means for receiving and said means for mounting, 2) reducing stress on both said means for providing a displacement surface and said means for following during engagement of said means for providing a displacement surface with said means for following and 3) decelerating said means for receiving during disengagement of said means for providing a displacement surface with said means for pivoting; and E) a means for receiving and modifying energy from a natural source into mechanical movement of said means for providing a displacement surface so as to impart to the fishing rod the jigging motion; II) connecting the fishing rod to said means for receiving the fishing rod; and III) adjusting said means for biasing so as to define an equilibrium angle with regard to said means for providing a displacement surface, when a restorative force exerted by said means for biasing is equal to an external force exerted by said fishing rod. In one embodiment, adjusting said means for biasing includes adjusting the position of an extension spring relative to a spring arm.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification: wherein, like reference numerals designate the same elements in the several views, and in which:

FIG. 1 illustrates an elevational view of a subassembly from an apparatus for jigging fishing tackle according to the present invention:

FIG. 2 illustrates an elevational view of apparatus for jigging fishing tackle according to the present invention;

FIG. 3 illustrates an expanded elevational view of a portion of the apparatus for jigging fishing tackle illustrated in FIG. 2;

FIG. 4 illustrates an elevational view of a subassembly from the apparatus for jigging fishing tackle illustrated in FIG. 2;

FIG. 5a illustrates an end view of a rotating shaft and cam according to the present invention;

FIG. 5b illustrates a side view of the rotating shaft and cam illustrated in FIG. 5a.

DESCRIPTION OF PREFERRED EMBODIMENTS

Figure 6:
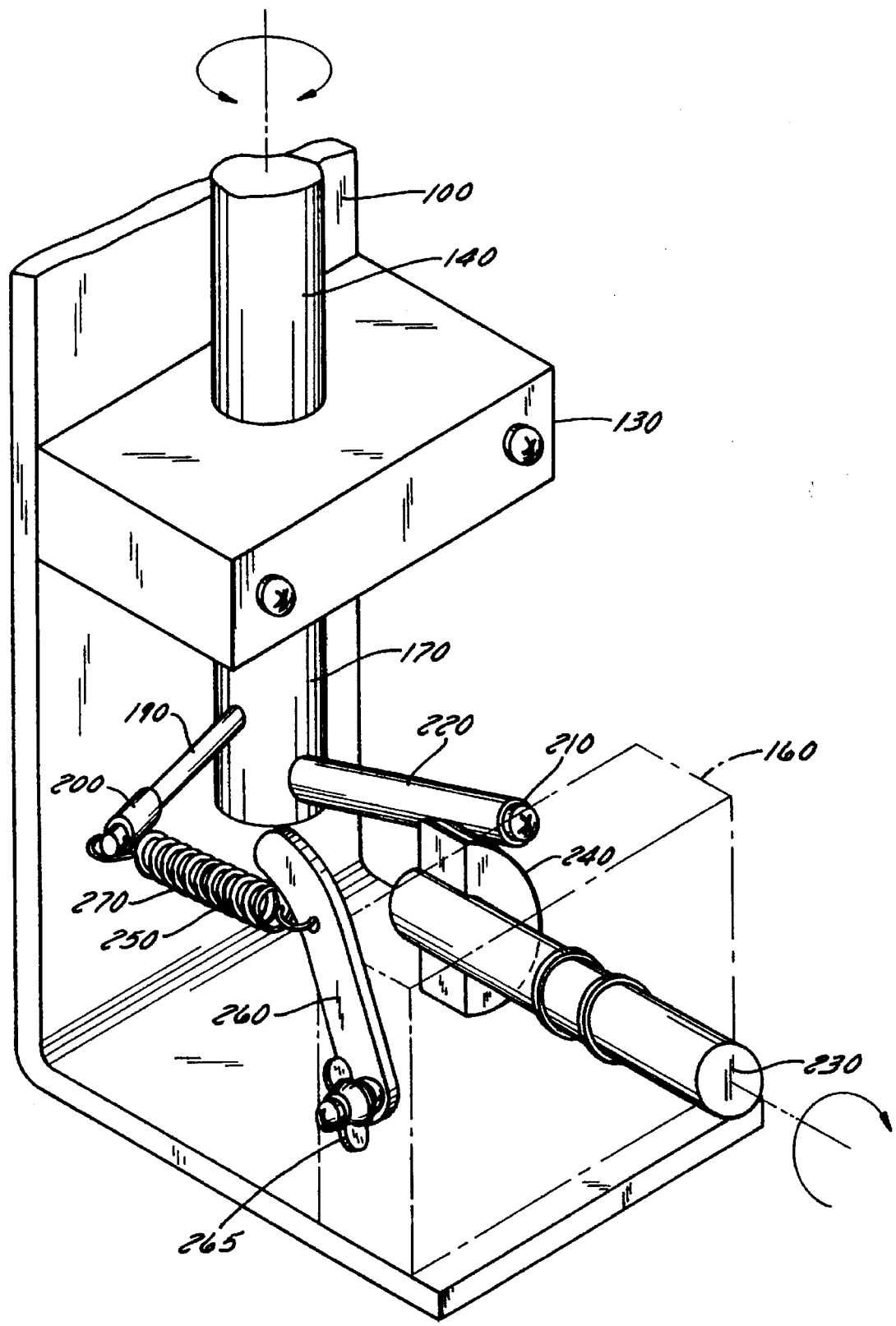
FIG. 6 illustrates a perspective view of a portion of an apparatus for jigging fishing tackle according to the present invention.

The present invention and the various features and advantageous details thereof are explained more fully with reference to the non-limiting embodiments described in detail in the following description.

1. System Overview

The above-mentioned requirements are mutually contradicting and cannot be satisfied simultaneously in the case of a simple direct mechanical linkage. However, it is rendered possible to simultaneously satisfy these requirements to a certain extent by employing a cam in combination with a biased oscillatory follower in consideration of the fact that the operating forces and speeds are relatively low. The origin of the resulting apparatus may be identified by the trademark JIG WHEEL.

The present invention is used in conjunction with a body of water. The body of water can be an ocean, a river, a lake, a stream, or the like. The present invention is also used in conjunction with a mounting. The mounting can be a boat, or other watercraft, or a pier, or other stationary object, such as a dike, or the like. The actuation of the moving parts of the present invention is preferably accomplished by relative movement between the body of water and the mounting.

In order to be actuated, the apparatus according to the present invention must be at least partially submerged in water that is moving relative to the apparatus. This relative movement permits an external force to be exerted on an oscillating shaft, for example by the drag induced by a lure on a fishing pole that is connected to the oscillating shaft. A restorative force exerted on the oscillating shaft acts in opposition to the external force, thereby modifying a jigging motion imposed on the oscillating shaft by the oscillating follower. It should be noted that if the direction of the external force is reversed with regard to the oscillating shaft, by for example, turning a boat heading downstream to head upstream, the direction of the restorative force must also be reversed to maintain the apparatus in an actuated state. The direction of the restorative force can be reversed by reconfiguring a dampener. The magnitude of the restorative force can be adjusted by modifying the configuration of the damper.

2. Detailed Description of Preferred Embodiments

Referring to the drawings, it can be seen that the preferred embodiment includes a paddle wheel as a prime mover. Pursuant to the present invention, the paddle wheel can be readily removed from the rest of the apparatus.

Referring to FIG. 1, the apparatus is shown with its prime mover removed. Frame 100 includes clamp bracket 110. An upper oscillating shaft support 120 is connected to frame 100. Upper oscillating shaft support 120 includes an upper oscillating shaft support hole. Lower oscillating shaft support 130 is connected to frame 100. Lower oscillating shaft support 130 includes a lower oscillating shaft support hole. Oscillating shaft 140 passes through and is freely rotatable within upper oscillating shaft support 120 and lower oscillating shaft support 130. Oscillating shaft 140 defines an oscillating shaft axis. Oscillating shaft 140 includes a first oscillating shaft tip 150. First oscillating shaft tip 150 includes a first bevel 151 and a second bevel 152. First oscillating shaft tip 150 includes first end face 155. Rotating shaft support 160 is connected to frame 100.

The first oscillating shaft tip 150 includes mounting bolt 180. Mounting bolt 180 defines a mounting bolt axis. A fishing rod holder (not shown) can be attached to mounting bolt 180. Mounting bolt 180 is preferably an electroplated (e.g., galvanized) headless screw bolt for interchangeable durability and oxidation resistance at low cost.

Although the preferred embodiment shown in FIG. 1 includes snap rings 122, 132 to hold oscillating shaft 140 in orthogonal relationship with upper oscillating shaft support 120 and lower oscillating shaft support 130, it is within the level of ordinary skill in the art after having knowledge of the invention disclosed herein to omit snap rings 122, 132, or to replace them with integrally formed flanges, or to use other fastening hardware to connect oscillating shaft 140 to upper oscillating shaft support 120 and lower oscillating shaft support 130. Further, these components can be connected in a non-orthogonal manner with regard to their external shape.

Referring now to FIG. 2, the apparatus is shown with its prime mover attached. In this embodiment, the prime mover is detachable paddle wheel 300. Oscillating shaft 140 includes a second oscillating shaft tip 170. The second oscillating shaft tip 170 includes a second end face 175.

Spring arm 190 is connected to oscillating shaft 140. Spring arm 190 is surrounded by sleeve bumper 200. Spring arm 190 defines a spring arm axis. Spring arm 190 is preferably an electroplated (e.g., galvanized) steel clevis pin.

Pivot arm 210 is connected to oscillating shaft 140. Pivot arm 210 defines a pivot arm axis. Oscillating follower 220 is connected to pivot arm 210. Oscillating follower 220 is preferably an oscillating roller follower to reduce friction on the cam surface.

Rotating shaft support 160 includes a rotating shaft hole. The rotating shaft hole defines a rotating shaft hole diameter. Rotating shaft 230 passes through the rotating shaft hole. Rotating shaft 230 defines a rotating shaft axis. Cam 240 is connected to rotating shaft 230. Cam 240 defines a cam center. Cam 240 is preferably a barrel cam.

Although the preferred embodiment shown in FIG. 2 includes snap rings that hold rotating shaft 230 in orthogonal relationship with rotating shaft support 160, (see also FIG. 5b), it is within the level of ordinary skill in the art after having knowledge of the invention disclosed herein to replace the snap rings with integrally formed flanges, or to provide other fasteners to connect rotating shaft 230 to rotating shaft support 160. Further, rotating shaft 230 can be connected to rotating shaft support 160 in an non-orthogonal manner.

Referring now to FIG. 3, rotating shaft 230 can be seen, again with the paddle wheel removed. Dampener 250 provides a restorative force between rotating shaft support 160 and oscillating shaft 140. In this embodiment dampener 250 includes spring bracket 260 and spring 270. Spring bracket 260 includes a first spring bracket end and a second bracket end. Spring 270 includes a first spring end and a second spring end. The first end of spring bracket 260 is connected to rotating shaft support 160 with a loosenable fastener 265. Loosenable fastener 265 is preferably a stainless steel wing nut. The first end of extension spring 270 is connected to spring arm 190. The second end of spring 270 is connected to the second end of spring bracket 260. Adjusting the angular position of spring bracket 260 determines the restorative force exerted by spring 270 for a given angular position of oscillating shaft 140.

Although spring 270 is preferably an extension spring, any structure that can exert a force between the spring arm 190 and the spring bracket 260 can be used in its place, such as, for example, a leaf spring, a coil spring, a piston, a torsion bar or even a rubber band. Similarly, any structure that can exert a restorative force against oscillating shaft 140 can be used in place of dampener 250, such as, for example, a jack with a spring, a rack and pinion with a piston, an indexed mounting plate with a shock absorber or even a sea anchor.

Although the preferred embodiment shown in FIG. 3 is depicted from a downstream perspective, dampener 250 is preferably removable without tools so as to be reconnected to the opposite side of rotating shaft support 160, thereby permitting the apparatus to be reconfigured for use with a current that flows in either direction. See FIG. 6 where the dampener 250 has been attached to the opposite side of rotating shaft support 160. Adjustments for the relative speed of the current are made by adjusting spring bracket 260.

Referring now to FIG. 4, a detachable driving rotor 300 is a preferred prime mover. Detachable driving rotor 300 includes hub 310. Hub 310 defines a hub axis. Hub 310 includes an outer rim 320 and an inner rim 330. Inner rim 330 defines a hub rotating shaft hole. The hub rotating shaft hole has a hub diameter. Hub 310 has a hub pin hole 340. Hub pin hole 340 extends from the outer rim to 320 to the inner rim 330. Hub pin hole 340 includes a pin recess 350.

A quick release mechanism 360 is located within pin recess 350. Quick release mechanism 360 includes a pin 370. Pin 370 is surrounded by spring 380. Spring 380 is preferably a compression spring. Pin retainer 390 is connected to pin 370. A plurality of spokes 400 are attached to the outer rim 320 of hub 310. A plurality of paddles 410 are attached to the plurality of spokes 400.

Referring again to FIG. 2, upper oscillating shaft support 120 includes cylindrical support bracket 125. Detachable driving rotor 300 can be removed from rotating shaft 230 through the use of quick release mechanism 360. Detachable driving rotor can then be reattached to either cylindrical support bracket 125 or rotating shaft 230.

The specific placement of the plurality of paddles 410 in relationship to the attachment point of pin 370 to rotating shaft 230 dictates that three (3) of the paddles composing detachable driving rotor 300 will be submerged in water that is moving relative to the apparatus so as to deliver the maximum amount of torque to rotating shaft 230 when the cam 240 engages oscillating follower 220. This placement is extremely important to assure proper functioning of the apparatus at slow trolling speeds or slow water currents.

Although the preferred embodiment shown in FIG. 4 includes seven (7) paddles, it is within the level of ordinary skill in the art after having knowledge of the invention disclosed herein to provide a different number of paddles. Further, the paddles can be arranged in different radial dispersions so as to optimize the available torque.

Referring to FIG. 5a, an end view of rotating shaft 230 and cam 240 can be appreciated. The cam size dictates the sweep radius of the fishing pole which is most crucial for proper bait or lure presentation. Cam 240 includes a cam profile 242. The cam profile dictates the movement of the fishing pole. Cam profile 242 includes a rise section 243, an in-contact dwell section 244, a return section 245 and an out-of-contact dwell section 246. Cam profile 242 can be tailored to the environmental conditions. Further, in-contact dwell section 244 and out-of-contact dwell section 246 can be omitted from cam profile 242. Cam 240 is connected to rotating shaft 230 with fastener 247. Rotating shaft 230 includes pin hole 235. Pin 370 fits into pin hole 235.

Although the preferred embodiment shown in FIG. 5a includes a cylindrical prism shaped cam, cam 240 can be provided in any geometrical configuration that imposes an oscillatory motion on the follower. Further, although cam 240 is depicted as having a disk shape, its coaction with oscillating follower 220 more properly characterizes cam 240 as a barrel cam.

Referring now to FIG. 5b, pin hole 235 can be more clearly seen passing partially through rotating shaft 230. Two snap rings can be seen in place around rotating shaft 230. At least one of these snap rings should be removed in order to properly insert rotating shaft 230 through the rotating shaft hole of rotating shaft support 160. The simple disk shape of cam 240 can also be seen in orthogonal relationship with rotating shaft 230.

While not being bound by theory, it is believed that the perpendicular facet of cam 240 will gradually assume a more rounded profile due to abrasion with follower 220. The gradual wearing process will result in cam 240 taking on a profile that is slightly less accelerative with regard to follower 220. Cam 240 can advantageously be fabricated from a material that has a low dynamic coefficient of friction and/or a self lubricating material such as, for example, graphite loaded high density polyvinychloride.

Referring now to FIG. 6, the operation of the apparatus will be better appreciated from a consideration of this perspective view. Note that the perspective of this figure assumes that the viewer of this figure has an elevated, offshore, downstream view of the apparatus. Due to the relative movement of the current, rotating shaft 230 will revolve in a clockwise manner as depicted. An external force provided by a fishing rod connected to oscillating shaft 140 will tend to urge oscillating shaft 140 in a clockwise manner, as depicted. Conversely, the restorative force exerted by spring 270 will tend to urge oscillating shaft 140 in a counterclockwise manner, as depicted.

As long as the external force is greater than the restorative force, pivot arm 210 and follower 220 will tend to rotate toward cam 240 until sleeve bumper 200 abuts frame 100. The external force urges the follower 220 toward cam 240 so as to define i) an equilibrium angle with regard to the rotating shaft axis, when the restorative force equals the external force, so that said oscillating follower is not in contact with said barrel cam and ii) a contact angle with regard to said rotating shaft axis, when the restorative force is less than the external force, so that said oscillating follower is in contact with said barrel cam.

As noted earlier, the dampener 250 can be removed from one side of support block 160 and reinstalled on the opposite side of the support block 160 so as to permit the apparatus to be used from the same side of a boat or pier when the current is in the opposite direction. To accomplish this reversal, both the dampener 250 and pivot arm 210 are removed from oscillating shaft 140. Pivot arm 210 is then reinstalled in a position that is rotationally 180° apart from the previous position. Similarly, spring arm 190 is pushed through the oscillating shaft 140 to emerge from the opposite side of oscillating shaft 140. The dampener 250 is reattached to the opposite side of support block 160 and the newly positioned spring arm 190.

The disclosed embodiments show a paddle wheel as the structure for performing the function of receiving and modifying energy from a natural source, (i.e., prime mover). However, this structure can be replaced with any other structure capable of turning the rotatable shaft, including, but not limited to, any structure capable of performing the function of receiving and modifying energy from a natural source, such as, for example, a propeller, a reaction turbine, or even a windmill.

While not being limited to any particular theory, it is believed that higher cam profiles are desirable in higher velocity bodies of water. This relationship may be due to the higher relative velocity between the lure, or bait, and stationary objects.

When the rise of the cam is excessively low, the oscillatory motion imposed on the rod is too small. On the other hand, when the rise of the cam is excessively high, there may be insufficient torque available from the prime mover to operate the device.

Conveniently, the fasteners of the present invention can be made of any tough water resistant material. For the manufacturing operation, it is moreover an advantage to employ stainless steel fasteners.

Conveniently, the frame of the present invention can be made of any rigid water resistant material. For the manufacturing operation, it is moreover an advantage to employ aluminum. However, for extended use in a salt water environment, it is an advantage to employ stainless steel or a plastic having a high modulus of elasticity.

Conveniently, the shafts of the present invention can be made of any durable water resistant material. For the manufacturing operation, it is moreover an advantage to employ a plastic, such as, for example, high density polyvinylchloride (PVC).

The starting materials for the plastic components can be prepared by cutting appropriate length sections from strip stock. These sections can then be prepared by the use of conventional cutting tools, such as, for example, drills and lathes.

Conveniently, the assembly of the plastic pans of the present invention can be carried out by using any joining method, such as, for example, stainless steel bolts or screws. For the manufacturing operation, it is moreover an advantage to employ a two-step adhesive and pneumatic nail gun method to join plastic pans that do not move in relation to one another, such as, for example the paddles and spokes.

All the disclosed embodiments are useful in conjunction with apparatus such as are used for the purpose of jigging fishing tackle, or for the more general purpose of imposing a periodic agitation, or the like. There are virtually innumerable uses for the present invention, all of which need not be detailed here. All the disclosed embodiments can be realized without undue experimentation.

Although the best mode contemplated by the inventor of carrying out the present invention is disclosed above, practice of the present invention is not limited thereto. It will be manifest to those of ordinary skill in the art that various additions, modifications and rearrangements of the features of the present invention may be made without deviating from the spirit and scope of the underlying inventive concept.

For example, the jigging motion could be enhanced by providing a cam of more complex profile. For example, the cam can have a multi-step compound profile. Similarly, although stainless steel is preferred for the connectors, any strong, water resistant material could be used in its place. The individual components of the invention need not be fabricated from the disclosed materials, but could be fabricated from virtually any suitable material.

Moreover, the individual components need not be formed in the disclosed shapes, or assembled in the disclosed configuration, but could be provided in virtually any shape, and assembled in virtually any configuration, which provides an oscillatory motion from a driving rotor so as to provide for the agitation of a structure. All the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A fishing pole agitator comprising:
   A) a frame;
   B) a clamp bracket removably attached to said frame;
   C) an upper oscillating shaft support attached to said frame, said upper oscillating shaft including an upper oscillating shaft support hole;
   D) a lower oscillating shaft support attached to said frame, said lower oscillating shaft including a lower oscillating shaft support hole;
   E) an oscillating shaft that passes through, and is freely rotatable within, both said upper oscillating shaft support hole and said lower oscillating shaft support hole, said oscillating shaft defining an oscillating shaft axis and including:
      1) a first oscillating shaft tip having a first bevel, a second bevel and a first end face;
      2) a second oscillating shaft tip having a second end face;
      3) a mounting bolt protruding from said first end face of said first oscillating shaft tip, said mounting bolt defining a mounting bolt axis that is approximately coaxial with said oscillating shaft axis; and
      4) a spring arm attached to said second oscillating shaft tip, said spring arm i) including a sleeve bumper, ii) protruding tangentially away from said second oscillating shaft end and iii) defining a spring arm axis that is approximately perpendicular to said oscillating shaft axis;
      5) a pivot arm attached to said second oscillating shaft tip between said mounting bolt and said second end face, said pivot arm i) including an oscillating follower, ii) protruding radially away from said second oscillating shaft end and iii) defining a pivot arm axis that is approximately perpendicular to said oscillating shaft axis;
   F) a rotating shaft support connected to said frame, said rotating shaft support having a rotating shaft hole defining a rotating shaft hole diameter;
   G) a rotating shaft that passes through, and is freely rotatable within, said rotating shaft hole, said rotating shaft defining i) a rotating shaft axis that is approximately perpendicular to said oscillating shaft axis and ii) a rotating shaft diameter that is smaller than said rotating shaft hole diameter;
   H) a barrel cam attached to said rotating shaft, said barrel cam defining a cam center that is approximately coaxial with said rotating shaft axis and having a cam profile that includes:
      1) a rise section;
      2) an in-contact dwell section;
      3) a return section; and
      4) an out-of-contact dwell section;
   I) a dampener connected to said rotating shaft support, said dampener including:
      1) a spring bracket removably adjustably connected to said rotating shaft support, said spring bracket including a first spring bracket end connected to said rotating shaft support and a second spring bracket end; and
      2) an extension spring having a first extension spring end attached to said spring arm and a second extension spring end attached to said second spring bracket end, said extension spring exerting a restorative force upon said spring arm so as to turn said oscillating shaft around said oscillating shaft axis in a first direction and urge said oscillating follower away from said barrel cam;
   J) a detachable driving rotor removably attached to said rotating shaft, said detachable driving rotor including:
      1) a hub defining a hub axis and having:
         a) an outer rim that is coaxial with said hub axis;
         b) an inner rim that is coaxial with said hub axis;
         c) a hub rotating shaft hole that is coaxial with said hub axis, said hub rotating shaft hole defining a hub diameter that is larger than said rotating shaft diameter;
         d) a hub pin hole that passes through said outer rim; and
         e) a pin recess that passes through said inner rim and is contiguous with both said hub rotating shaft hole and said hub pin hole;
      2) a quick release mechanism having:
         a) a pin which passes through said hub pin hole;
         b) a compression spring surrounding said pin and located in said pin recess;
         c) and a pin retainer attached to said pin, adjacent said compression spring and located in said pin recess;

3) a plurality of spokes radially connected to the outer rim of the hub; and 4) a plurality of paddles, each of said plurality of paddles i) defining a plane that is substantially parallel to said hub axis and ii) being connected to one of said plurality of spokes, wherein, upon application of an external force acting upon said mounting bolt so as to turn said oscillating shaft around said oscillating shaft axis in a second direction that is opposite to said first direction, the external force urges said oscillating follower toward said barrel cam so as to define i) an equilibrium angle with regard to said rotating shaft axis, when the restorative force equals the external force, so that said oscillating follower is not in contact with said barrel cam and ii) a contact angle with regard to said rotating shaft axis, when the restorative force is less than the external force, so that said oscillating follower is in contact with said barrel cam.

2. The apparatus of claim 1, wherein said upper oscillating shaft support includes a cylindrical support bracket, said support bracket defining an axis that is approximately perpendicular to said oscillating shaft and a cylindrical support bracket diameter than is smaller than said rotating shaft diameter.

3. The apparatus of claim 1, wherein said spring bracket is adjustable so as to render a tension provided by said extension spring with regard to said spring arm to be infinitely adjustable within a range.

4. The apparatus of claim 1, wherein said oscillating follower is an oscillating roller follower.

5. Apparatus comprising:

A) a frame;

B) an oscillating shaft that is rotatably connected to said frame, said oscillating shaft defining an oscillating shaft axis and including:

1) an oscillating shaft tip;

2) an oscillating arm attached to said oscillating shaft tip, said oscillating arm i) protruding tangentially away from said oscillating shaft tip and ii) defining an oscillating arm axis that is approximately perpendicular to said oscillating shaft axis; and 3) a pivot arm attached to said oscillating shaft tip, said pivot arm i) including an oscillating follower, ii) protruding radially away from said oscillating shaft tip and iii) defining a pivot arm axis that is approximately perpendicular to said oscillating shaft axis;

c) a rotating shaft rotatably connected to said frame, said rotating shaft defining a rotating shaft axis that is approximately perpendicular to said oscillating shaft axis;

D) a cam attached to said rotating shaft, said cam defining a cam center that is approximately coaxial with said rotating shaft axis and having a profile that includes:

1) a rise section; and 2) a return section;

E) a dampener connected to said frame, said dampener exerting a restorative force upon said oscillating arm so as to turn said oscillating shaft around said oscillating shaft axis in a first direction and urge said oscillating follower away from said cam, wherein, upon application of an external force acting upon said oscillating shaft so as to turn said oscillating shaft around said oscillating shaft axis in a second direction that is opposite to said first direction, the external force urges said oscillating follower toward said cam so as to define i) an equilibrium angle with regard to said rotating oscillating shaft axis, when the restorative force equals the external force, so that said oscillating follower is not in contact with said cam and ii) a contact angle, defined with regard to said oscillating shaft axis, where the restorative force is less than the external force, when said oscillating follower is in contact with said cam.

6. The apparatus of claim 5, further comprising a detachable driving rotor removably attached to said rotating shaft, said detachable driving rotor including:

1) a hub defining a hub axis and having:

a) an outer rim that is coaxial with said hub axis;

b) an inner rim that is coaxial with said hub axis;

c) a hub rotating shaft hole that is coaxial with said hub axis, said hub rotating shaft hole defining a hub diameter that is larger than said rotating shaft diameter;

d) a hub pin hole that passes through said outer rim; and e) a pin recess that passes through said inner rim and is contiguous with both said hub rotating shaft hole and said hub pin hole;

2) a quick release mechanism having:

a) a pin which passes through said hub pin hole;

b) a spring surrounding said pin and located in said pin recess;

c) and a pin retainer attached to said pin, adjacent said spring and located in said pin recess;

3) a plurality of spokes radially connected to the outer rim of the hub; and 4) a plurality of paddles, each of said plurality of paddles i) defining a plane that is substantially parallel to said hub axis and ii) being connected to one of said plurality of spokes.

7. The fixture of claim 6, further comprising a cylindrical support bracket, said support bracket defining an axis that is approximately perpendicular to said oscillating shaft and a cylindrical support bracket diameter than is smaller than said rotating shaft diameter.

8. The apparatus of claim 6, wherein said dampener includes a spring bracket that is adjustable so as to render a tension provided by said dampener with regard to said oscillating arm to be infinitely adjustable within a range.

9. The apparatus of claim 5, wherein said cam is a barrel cam.

10. The apparatus of claim 5, wherein said cam profile includes an in-contact dwell section and an out-of-contact dwell section.

11. The apparatus of claim 5 wherein said oscillating follower is an oscillating roller follower.

12. The apparatus of claim 5 wherein said oscillating arm is a spring arm.

13. The apparatus of claim 5 wherein said oscillating arm includes a sleeve bumper.

14. The apparatus of claim 5 wherein said dampener includes an adjustable spring bracket.

15. The apparatus of claim 5 wherein said dampener includes a spring.

16. The apparatus of claim 15 wherein said spring is an extension spring.

17. A fixture for imparting to a fishing rod a jigging motion comprising:

I) a means for mounting the fixture on a surface;

II) a means for receiving the fishing rod, said means for receiving the fishing rod A) being pivotally carried by said means for mounting the fixture on a surface and B) including a means for following;

III) a means for providing a displacement surface, said displacement surface A) being in operable connection with said means for following and B) including:
   1) a rise section which causes said displacement surface to engage said means for following; and
   2) a return section which causes said displacement surface to disengage said means for following;

IV) a means for biasing said means for receiving the fishing rod, said means for biasing A) being connected to both said means for receiving and said means for mounting, B) reducing stress on both said means for providing a displacement surface and said means for following during engagement of said means for providing a displacement surface with said means for following and C) decelerating said means for receiving during disengagement of said means for providing a displacement surface with said means for following; and V) a means for receiving and modifying energy from a natural source into mechanical movement of said means for providing a displacement surface so as to impart to the fishing rod the jigging motion.

18. The fixture of claim 17 where said means for biasing includes an extension spring connected to said means for following.

19. A method of fishing comprising
   I) providing a fixture for imparting to a fishing rod a jigging motion including:
      A) a means for mounting the fixture on a surface;
      B) a means for receiving the fishing rod, said means for receiving the fishing rod 1) being pivotally carried by said means for mounting the fixture on a surface and 2) including a means for following;
      C) a means for providing a displacement surface, said displacement surface i) being in operable connection with said means for following and ii) including:
         1) a rise section which causes said displacement surface to engage said means for following;
         2) a first dwell section which maintains said displacement surface in engagement with said means for following;
         3) a return section which causes said displacement surface to disengage said means for following; and
         4) a second dwell section which maintains said displacement surface in disengagement with said means for following;
      D) a means for biasing said means for receiving the fishing rod, said means for biasing 1) being connected to both said means for receiving and said means for mounting, 2) reducing stress on both said means for providing a displacement surface and said means for following during engagement of said means for providing a displacement surface with said means for following and 3) decelerating said means for receiving during disengagement of said means for providing a displacement surface with said means for pivoting; and
      E) a means for receiving and modifying energy from a natural source into mechanical movement of said means for providing a displacement surface so as to impart to the fishing rod the jigging motion;
   II) connecting the fishing rod to said means for receiving the fishing rod; and
   III) adjusting said means for biasing so as to define an equilibrium angle with regard to said means for providing a displacement surface, when a restorative force exerted by said means for biasing is equal to an external force exerted by said fishing rod.

20. The method of claim 19 wherein adjusting said means for biasing includes adjusting the position of an extension spring relative to a spring arm.

* * * * *